(12) United States Patent
Sañudo Tofiño et al.

(10) Patent No.: US 6,822,577 B2
(45) Date of Patent: Nov. 23, 2004

(54) POSITION INDICATOR FOR SUBMERGED VALVES

(75) Inventors: José Luis Sañudo Tofiño, Madrid (ES); Gerardo Bonnin Barcelo, Madrid (ES)

(73) Assignees: S. L. Servinge, Madrid (ES); Alfonso Ferrer Figueroa, Madrid (ES)

( * ) Notice: Subject to any disclaimer, the term of this patent is extended or adjusted under 35 U.S.C. 154(b) by 259 days.

(21) Appl. No.: 10/060,913

(22) Filed: Jan. 29, 2002

(65) Prior Publication Data

US 2002/0092863 A1 Jul. 18, 2002

Related U.S. Application Data

(63) Continuation of application No. PCT/ES00/00281, filed on Jul. 27, 2000.

(30) Foreign Application Priority Data

Jul. 29, 1999 (ES) .............................................. P9901716

(51) Int. Cl.⁷ .............................................. G08B 21/00
(52) U.S. Cl. ................................ 340/686.1; 137/315.18
(58) Field of Search ....................... 340/686.1; 137/491, 137/315.18, 315.38; 251/159, 161, 164

(56) References Cited

U.S. PATENT DOCUMENTS

| | | | |
|---|---|---|---|
| 2,826,165 A | 3/1958 | Adelson | 116/125 |
| 3,658,087 A | * 4/1972 | Nelson | 137/454.6 |
| 3,921,665 A | 11/1975 | Lebzelter | 137/553 |
| 4,191,248 A | * 3/1980 | Huebsch et al. | 166/66.7 |
| 4,727,901 A | * 3/1988 | Horvei | 137/315.18 |
| 4,766,931 A | * 8/1988 | Chauvier et al. | 137/624.14 |
| 5,109,692 A | 5/1992 | Fitzgerald | 73/168 |
| 5,698,781 A | * 12/1997 | Zellering | 73/197 |
| 5,722,286 A | 3/1998 | Robert et al. | 73/168 |

FOREIGN PATENT DOCUMENTS

DE        1115090        10/1961

* cited by examiner

Primary Examiner—John Tweel
(74) Attorney, Agent, or Firm—Klauber & Jackson

(57) ABSTRACT

The position indicator is applicable to submerged valves forming part of hydraulic systems for the transfer of liquids or gas, based on that the corresponding signal which is obtained as a consequence of the state or position (open or closed) of the valve is transmitted by hydraulic pressure, from a long distance and transformed into an analog or digital signal which can be viewed on a display screen. The position of the valve (2) is set by the position of an actuator shaft (3') to which are secured cams (11) so that the rotation of the shaft causes the cams (11) to act on hydraulic cartridges (12), thereby regulating the position of said cartridges, and as a consequence, regulating the pressure of a secondary hydraulic system to provide said pressure signal which can be converted to any type of reliable indication, corresponding to the real position of the valve (2).

4 Claims, 2 Drawing Sheets

POSITION INDICATOR FOR SUBMERGED VALVES

"This application is a continuation of international application number PCT ES0(/00/00281, filed Jul. 27, 2000. (status, abandoned, pending, etc.)."

OBJECT OF THE INVENTION

The invention refers to a position indicator for submerged valves, intended to provide as a result totally accurate and reliable remote signalling of the position of a valve submerged in a fluid (liquid or gas) in a tank or in any other volume of fluid, thereby guaranteeing the non-existence of erroneous signals, something that frequently occurs in the systems or devices that are currently used.

The indicator has been conceived for being applied preferably and fundamentally in hydraulic systems for the transfer of fluids so that the position of submerged valves can be known with reliability in the tanks of ships, thus permitting the correct functioning at all times of the hydraulic systems and preventing any incidents and/or accidents from occurring. Its application can be made to extend to any other practical situation in which their use is required, i.e., in all those cases in which it is necessary to know with reliability the position of a valve submerged in a fluid (liquid or gas).

BACKGROUND OF THE INVENTION

Currently, the way to detect the position of submerged valves used in certain hydraulic systems for transferring and/or controlling fluids, is in most cases based on obtaining volumetric type signals, in other words, based on systems that relate the flow of hydraulic oil used as the drive element for the appropriate actuator for the valve, with the movement of the latter.

It is evident that, even in cases in which the system is functioning correctly, the position signal obtained can be distorted due to various reasons, with the consequence that the position reading of the valve provided by the system or device may not be correct. For example, expansions, minor leaks, etc., usually give rise to a distortion of the resulting position signal and therefore lead to a wrong reading, and the error becomes greater in cases in which the system is computer operated.

On the other hand, certain circumstances and actions, such as greater closure times in order to prevent excess pressure, greater sizes of valved and therefore larger actuators, can give rise to a flow that cannot prevent failure of the volumetric indicators (failures that lead to seizure, discontinuous readings, etc.), which can in turn lead to incidents or even accidents since in particular cases where they are being used in the tanks of ships this can cause the ship to list to one side, or it can cause the tanks to overflow, flooding of the ship, pollution, or apparatus or machines within reach of the flood or the overflow could break down or be put out of action.

DE Patent 1115090 discloses a position indicator for cut-off valves which uses a displaceable spindle wharve along the axis of the actuator shaft of the valve; the movement of the spindle wharve alters the position of a stem which finally produces an increase in the pressure of the hydraulic circuit.

DESCRIPTION OF THE INVENTION

The indicator of the invention is based on the fact that the signal by which the position reading of the submerged valve is obtained is transmitted by hydraulic pressure, with the particular feature that the unit formed from the indicator and components associated with it present certain structural and functional characteristics permitting the drawbacks referred to above to be solved, providing as a result a totally reliable signal, in other words, the position reading of the valve that it is sought to control is correct.

More specifically, the indicator itself consists of an actuator shaft by means of which the corresponding valve is opened and/or closed, and is operated by any suitable conventional system. In its operation, this shaft includes mechanical means capable of acting on one or more hydraulic cartridges in which regulation of the pressure takes place which in turn acts to regulate the pressure of a secondary hydraulic system, producing a pressure signal that is transmitted to a converter which transforms the signal into any kind of visible reading on a display screen, all this in such a way that the reading will correspond to the specific correct position of the valve.

By means of this indicator, the signal obtained remotely, and therefore the result of the reading of the valve position, is wholly reliable and accurate.

In a preferred embodiment of the invention, the mechanical means that acts on the hydraulic cartridges consists of cams secured to the actuating shaft, in such a way that as the shaft rotates the cams impinge on the hydraulic cartridge or cartridges in order to transmit the corresponding pressure signal to the position indicator of the valve.

In addition to the components and means that form part of the indicator and/or which are associated with it for its proper functioning, the indicator is also indirectly related to a main hydraulic unit and a control and command unit with the latter being connected to the actuator itself. The main hydraulic unit is intended to provide the hydraulic system with power and operation involved in the functioning of the valve via the actuator.

Among the advantages derived from the new conception of the position indicator of the invention, in addition to the fundamental advantage of reliability already referred to, mention can be made of the following:

Depending on the type of hydraulic cartridge used and an possible combinations thereof, an on-off reading can be obtained (open/closed valve) or a continuous reading, i.e., a reading of any intermediate position between the open/closed limits.

As well as being able to transmit the signal over long distances, given that it is a pressure transmission by hydraulic fluid, it can be used in certain types of installations or industries in which there exist zones classified as type "0" or the like, in other words, dangerous zones.

No kind of certification is required since the device does not contain any electrical components.

The pressure signal can be converted into an analog or digital signal by any conventional means in the control area, this aspect being compatible with any display system currently known.

BRIEF DESCRIPTION OF THE DRAWINGS

With the aim of aiding a better understanding of the characteristics of the invention, this description is accompanied by a set of plans containing drawings on the basis of which the innovations and advantages of the pressure indicator for submerged valves, the object of the invention, will be more easily understood.

DESCRIPTION OF PREFERRED EMBODIMENT OF THE INVENTION

Figure 1:
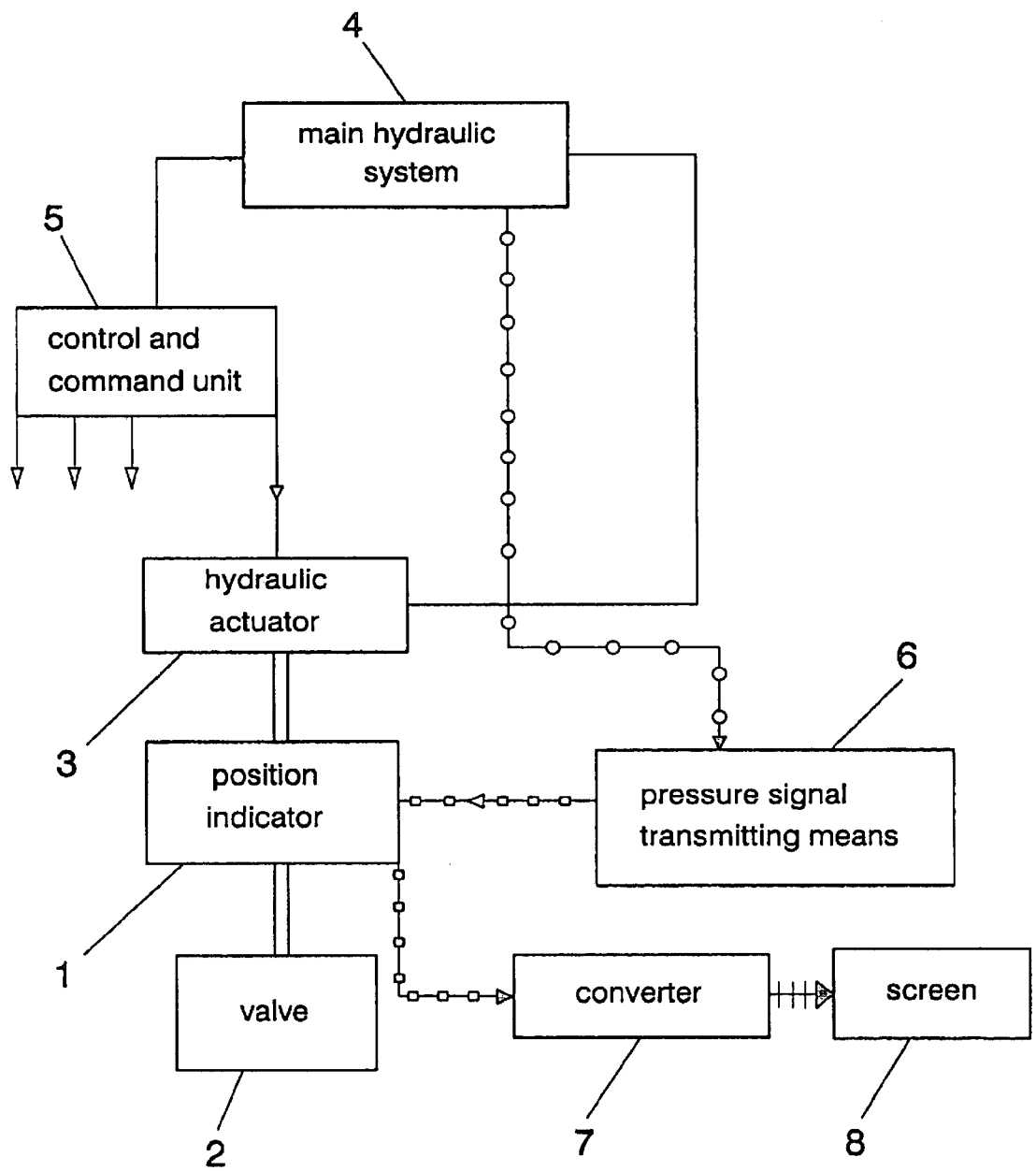
FIG. 1 shows the block diagram for the indicator, along with all the elements and components taking part in the corresponding hydraulic system.

As can be seen in the block diagram of FIG. 1, the block for the position indicator is represented by 1, while 2 is the valve or cut-off valve and 3 the hydraulic actuator. Forming part of the assembly, one can see block 4 corresponding to the main hydraulic unit, block 5 corresponding to the control and command unit, and block 6 corresponding to the secondary hydraulic unit, all of them being connected as represented in said figure in such a way that the output from block 1 corresponding to the position indicator is a pressure signal which is made to pass via a converter, block 7, so that it can be converted into an analog or digital signal. This signal is then shown on a display screen represented by block 8 in this FIG. 1.

Figure 2:
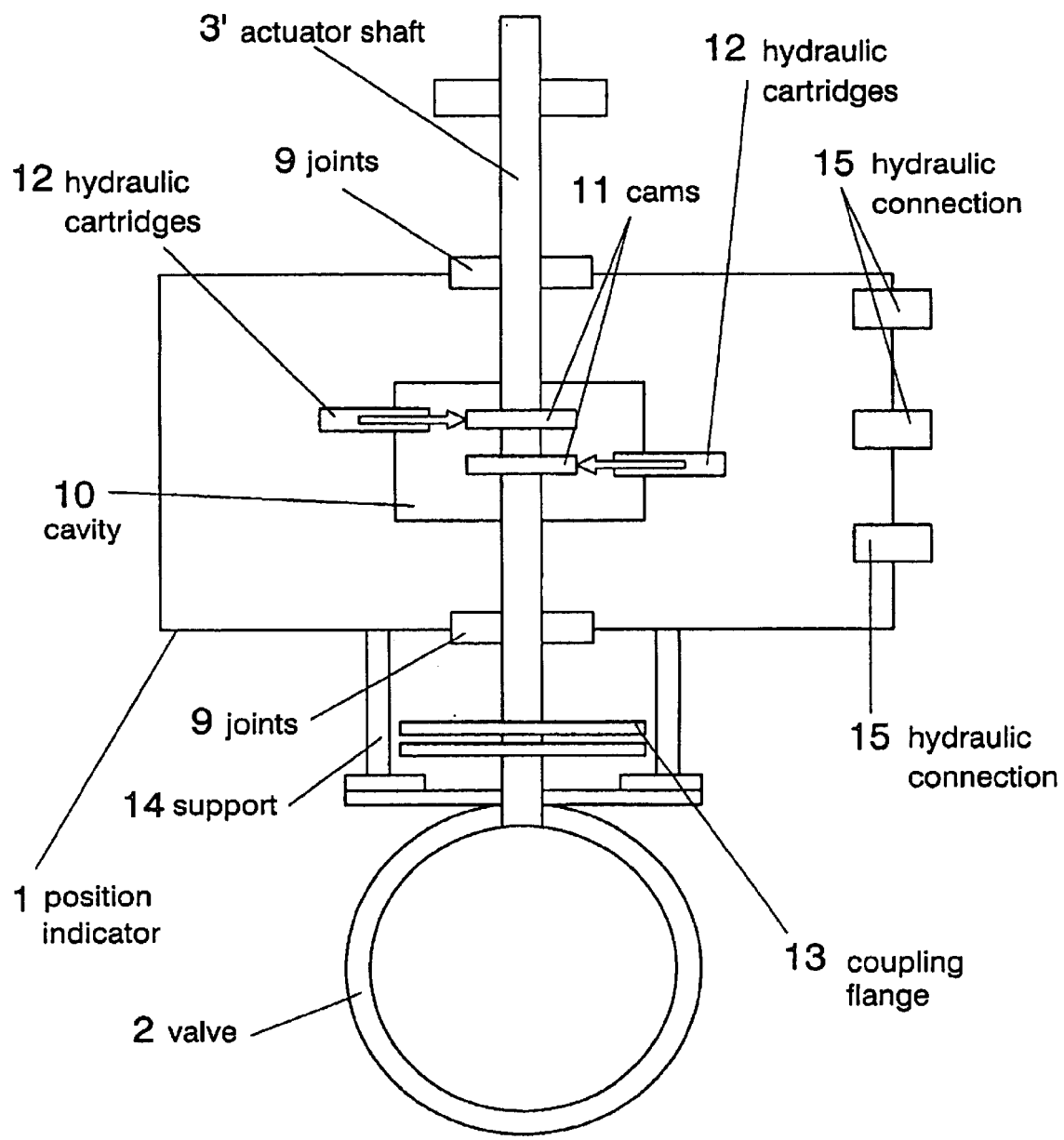
FIG. 2 shows a practical design as schematic level of the position indicator object of the invention, applied to a valve or cut-off valve and in which the actuator shaft is rotary.

FIG. 2 is a schematic representation of a specific embodiment of the position indicator, in which the position of the valve or cut-off valve 2 is determined by the position of the actuator shaft 3', which is of course linked to the hydraulic actuator 3 referred to in FIG. 1. This shaft 3' is rotary an passes through block 1 corresponding to the position indicator, being hermetically sealed by means of corresponding joints 9. Inside block 1, there is a recess or cavity 10 in which a pair of cams 11 have been provided integral with the shaft 3'. Said cams act on one or two hydraulic cartridges 12 whose design and functioning characteristics are very well known, in such a way that by means of these cartridges 12 the pressure of a secondary hydraulic system is regulated in order to produce a pressure signal which is transformed or converted in block 7 of FIG. 1. As it has been said earlier, said conversion can be to any kind of digital or analog reading so that it can be shown on the display screen of block 8, FIG. 1. In this FIG. 2, reference 13 corresponds to a force or coupling flange which takes part in the closing/opening of the valve or cut-off valve 2, and it also includes the support 14 for the entire assembly, plus the corresponding hydraulic connections 15.

We claim:

1. A position indicator for a submerged valve, said valve forming part of a main hydraulic system for transfer of fluids, the position indicator comprising a pressure signal generating means for generating a pressure signal being indicative of a position of the valve; said pressure signal being convertible into an indication being displayable on a visualization screen;
wherein said pressure signal generating means comprises at least one hydraulic cartridge;

a pressure signal transmitting means for transmitting the pressure signal over long distances;

a mechanical means for detecting the position of the valve;

wherein said mechanical means comprises at least one cam fixedly positioned on a rotating actuator shaft of the valve for acting upon the pressure signal generating means upon rotation of the rotating actuator shaft which actuates the valve, the mechanical means converting a circular motion of the actuator shaft into a rectilinear motion of a part of the pressure signal generating means, thereby generating the pressure signal indicative of a position of the valve.

2. A position indicator according to claim 1, wherein said pressure signal transmitting same transmits the pressure signal to a converter, said converter converting the pressure signal into a signal selected from analog and digital signals that are indicative of the position of the valve for displaying thereof on a screen.

3. A position indicator according to claim 1, wherein said pressure signal transmitting means is a secondary hydraulic system being associated to the main hydraulic system.

4. A position indicator according to claim 2 wherein said pressure signal transmitting means is a secondary hydraulic system associated with the main hydraulic system.

* * * * *